United States Patent [19]

Barrett

[11] Patent Number: 5,210,410

[45] Date of Patent: May 11, 1993

[54] SCANNING PROBE MICROSCOPE HAVING SCAN CORRECTION

[75] Inventor: Robert Barrett, San Jose

[73] Assignee: The Board of Trustees of the Leland Stanford Junior University, Stanford, Calif.

[21] Appl. No.: 766,656

[22] Filed: Sep. 26, 1991

[51] Int. Cl.$^5$ .............................................. G01N 23/00
[52] U.S. Cl. ................................. 250/234; 250/306; 318/640
[58] Field of Search ............ 250/306, 307, 561, 211 K, 250/201.3, 201.1, 234, 235, 229, 231.1; 318/640, 116, 118; 356/375, 373; 33/1 M

[56] References Cited

U.S. PATENT DOCUMENTS

| | | | |
|---|---|---|---|
| 4,152,729 | 5/1979 | Hobbs et al. | 250/201.1 |
| 4,584,510 | 4/1986 | Hollow | 250/229 |
| 4,638,232 | 1/1987 | Stridsberg et al. | 318/640 |
| 4,724,318 | 2/1988 | Binnig | 250/307 |
| 4,731,530 | 3/1988 | Mikan | 250/229 |
| 4,772,835 | 9/1988 | Weaver et al. | 318/640 |
| 4,825,069 | 4/1989 | Hutchisson et al. | 250/229 |
| 5,065,103 | 11/1991 | Slinkman et al. | 250/307 |
| 5,079,432 | 1/1992 | Miller | 250/561 |
| 5,117,110 | 5/1992 | Yasutake | 250/306 |

FOREIGN PATENT DOCUMENTS 1-78803  7/1989  Japan .................................. 250/306

OTHER PUBLICATIONS

Barrett et al., "Optical Scan-Correction System Applied to Atomic Force Microscopy," *Rev. Sci. Instrum.* 62(6), Jun. 1991, pp. 1393–1399.

Griffith et al., "A Scanning Tunneling Microscope with a Capacitance-based Position Monitor," *J. Vac. Sci. Technol. B* 8(6), Nov./Dec. 10, 1990, pp. 2023–2027.

Marti et al., "Control Electronics for Atomic Force Microscopy", *Rev. Sci. Instrum.* 59(6), Jun. 1988, pp. 836–839.

*Primary Examiner*—David C. Nelms
*Assistant Examiner*—Michael Messinger
*Attorney, Agent, or Firm*—Flehr, Hohbach, Test, Albritton & Herbert

[57] ABSTRACT

An atomic force microscope is described having a scan correction arrangement. Sensors detect the actual position of tubular scanners for a sample in an xy plane. This position information is then used for post-imaging correction or as a feedback signal. Detection and use of the actual position assures that errors caused by hysteresis, etc., are obviated. Various embodiments of an appropriate sensor are described.

22 Claims, 4 Drawing Sheets

SCANNING PROBE MICROSCOPE HAVING SCAN CORRECTION

STATEMENT AS TO RIGHTS TO INVENTIONS MADE UNDER FEDERALLY-SPONSORED RESEARCH AND DEVELOPMENT

This invention was made with Government support under contract N00014-84-K-0327 awarded by the Office of Naval Research and contract ECS-8917552 awarded by the National Science Foundation. The Government has certain rights in this invention.

BACKGROUND OF THE INVENTION

The present invention relates to scanning probe microscopy and, more particularly, to a scanning probe microscope having a scan-correction system.

Nearly all scanning probe microscopes, such as scanning tunneling microscopes (STMs), atomic force microscopes (AFMs) and near field acoustic microscopes, use piezoelectric actuators for generating the scans. Piezoelectric materials offer many good properties for such applications: high resolution, high mechanical resonance frequencies, reasonable scan ranges, physical compactness, and low power consumption. A typical piezoelectric tube scanner used in an AFM has a resolution of 1 Å, a resonance frequency of 2 kHz, and a scan range of 20 μm. Unfortunately, piezoelectric elements have some undesirable properties resulting in non-linear effects. These distortions take three basic forms: hysteresis (where the steady-state scanner position for a given control input is a function of the past history of movement), creep (where the scanner motion slowly drifts in the direction of recent movements), and non-linear response (where the position of the scanner is not a linear function of the control input).

These non-linear effects make accurate measurements based on scanning probe images very difficult to obtain. For atomic-scale imaging, though, these non-ideal characteristics are not too severe for two reasons: (1) the non-linear behavior of the scanner is small for small scans, and (2) most of the important dimensional parameters, such as bond lengths, are already well known through other measurement techniques. However, for larger-scale imaging applications, such as imaging microfabricated structures, these non-linear effects can create significant distortions in the images. For example, several types of errors generated in images by them include: image "stretching" from one side of the image to the other; nonrepeatable imaging, where the actual scan area depends on the hysteresis of the scanner; and overall image sizes that do not scale linearly with the magnitude of the control input.

One method for reducing these errors is to compensate for known scanner distortions by applying a complex control signal to the scanner. This technique is somewhat helpful, but the number of parameters needed to adequately compensate for the distortions is large. The distortions depend upon the scan speed and waveform, scan size, and the biasing conditions of the scanner's piezoelectric elements. Another method which has been implemented uses the charge on the piezoelectric element, rather than the applied voltage, as the control signal. See, for example, the paper entitled "Application of capacitor insertion method to scanning tunneling microscopes" by Hiroshi Kaizuka which appeared in Vol. 60, No. 10, pages 3119 et seq. of the *Review of Scientific Instruments* (1989). Unfortunately, this method reduces the available scan range considerably and does not, even theoretically, eliminate the non-linearity completely. The most promising method for correcting the scanner non-linearities is to measure the sample or scanner position with a sensitive detector and then to use this information to correct the non-linearities. A relatively complicated heterodyned interferometric arrangement for measuring the scanner position is described in the paper entitled "Linewidth Measurement by a New Scanning Tunneling Microscope" by Yamada, et al., appearing on pages 2402-2404 in the *Japanese Journal of Applied Physics*, Vol. 28, No. 11 (1989). The complexity of this arrangement adds to its cost and makes the same unwieldy. Another arrangement requiring direct connection to the sample is disclosed in the paper entitled "Near-field optical scanning microscopy with tunnel-distance regulation" by Dürig, et al., on pages 478 et seq. of the *IBM Journal of Research and Development*, Vol. 30, No. 5 (1986).

SUMMARY OF THE INVENTION

The present invention is a scanning probe microscope having a scan-correction arrangement that is quite compact and yet reliably reduces scanning image distortions. It includes a simple, compact sensor which measures actual scanner movements. It also includes alternatively either real-time feedback correction or post-imaging correction.

In more detail, the scanning probe microscope of the invention includes means for supporting both the sample and the probe for relative scanning movement therebetween; means for sensing a multiple number of times during such relative scanning movement, the relative position of a portion of the support means along a selected coordinate relative to the position of the probe; and means for responding to the sensing a multiple number of times for each scanning movement, by compensating for any difference between the sensed position of the sensed portion along the selected coordinate at the time of said sensings and expected positions of the same therealong. (By "expected positions" is meant the positions that would be obtained if there were not the distortions discussed above.)

The invention is particularly applicable to scanning probe microscopes having a piezoelectric scanning stage made up, for example, of a piezoelectric tubular scanners which supports and provides scanning movement to a sample. It is also applicable, though, to microscopes having bimorph piezoelectric scanners. Moreover, it has been found to be especially useful when the scanning probe microscope is an atomic force microscope (or other scanning probe microscopes incorporating AFMs) and the expected position is one that is obtained when there is scanning movement along the x and y axes.

Most desirably, measurements are made along two orthogonal coordinates, both the x and the y axes. Also, the sensing means most simply is an optical beam position one as will be described.

Other objects, features and advantages of the invention either will become apparent or will be described in connection with the following, more detailed description of preferred embodiments of the invention.

BRIEF DESCRIPTION OF THE DRAWINGS

With reference to the accompanying four sheets of drawing.

DESCRIPTION OF PREFERRED EMBODIMENTS

Figure 1:
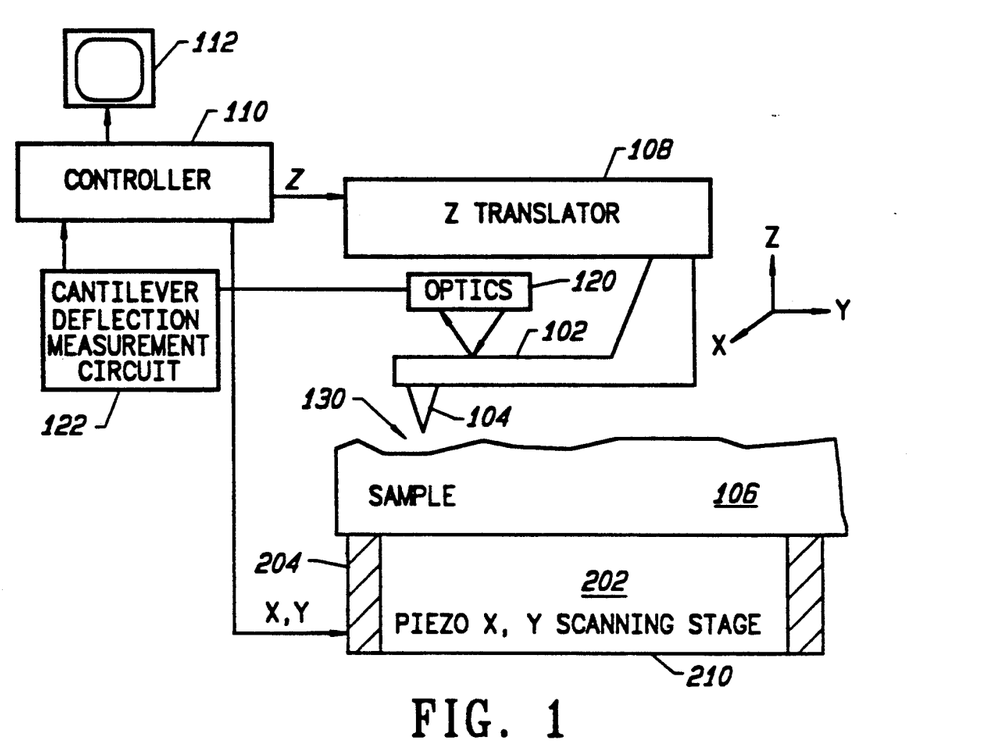
FIG. 1 is an overall schematic view of an atomic force microscope in accordance with a preferred embodiment of the invention.
Figure 2:
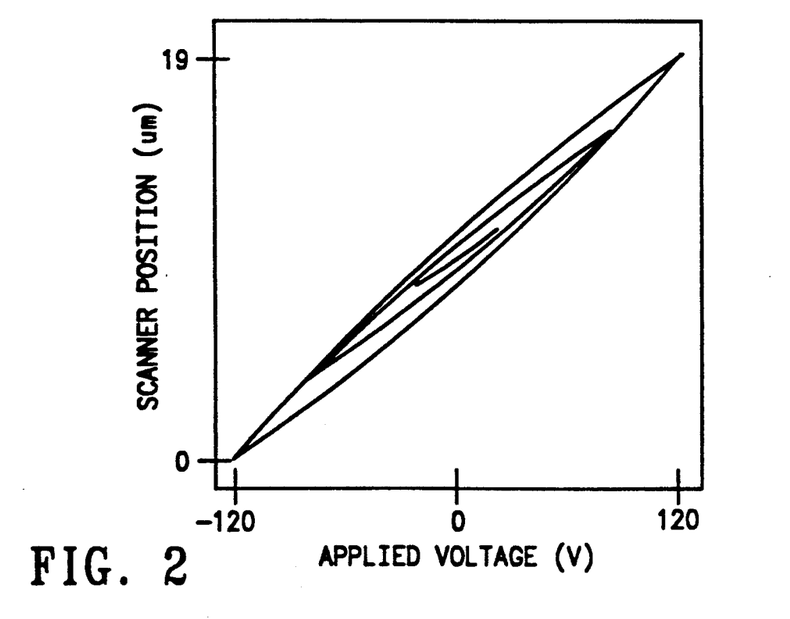
FIG. 2 is a graph included to illustrate problems associated with piezoelectric scanners, solved by the instant invention.

As previously mentioned, the invention is particularly applicable to atomic force microscopes. FIG. 1 is a conceptual diagram of the same. A microminiature cantilever arm 102 has a projecting tip 104 at its free end used to probe the surface of a sample 106. In accordance with conventional practice, the scanning is similar to raster scanning. Scanning in the x and y directions is accomplished by an XY scanning stage 202. Such scanning stage is a "piezo scanning tube" type of stage which uses a tubular piezoelectric scanner to precisely move the sample 106 along the x and y coordinates. That is, the sample 106 is supported by a tubular scanner 204 which extends between a non-moving structure represented at 210 and the sample. In accordance with conventional practice, the scanner 204 is a tube having arcuate conductive sections 212 (see FIG. 3—one of which is shown) separated from one another by insulating strips 214 which extend lengthwise. The sections can be activated together to provide desired movement along the z axis. In this connection, it must be remembered that the z axis is generally normal to the plane defined by the xy coordinates. As an alternative, a separate Z translator stage 108 can be provided to move cantilever/probe 102 along the z axis.

Scanning is controlled by a programmed microcontroller or computer 110 which also analyzes measurement data and displays measurement information on display 112. It should be mentioned that in some AFMs the sample surface is scanned by using an x,y,z translator to move the cantilever while keeping the sample stationary, and in others the cantilever is kept stationary while an x,y,z translator stage moves the sample.

The AFM of the invention is conventional in that it has both a "contacting mode" and a "non-contacting mode" of operation. In the contacting mode of operation, the tip 104 rides on the surface of the sample 106 with an extremely light tracking force, on the order of $10^{-5}$ to $10^{-10}$ N. Profiles of the surface topography are obtained with extremely high resolution. Images showing the position of individual atoms at the surface of the sample are routinely obtained. In the second non-contacting mode of operation, the tip 104 is held a short distance, on the order of 5 to 500 Angstroms, from the surface of the sample and is deflected by various forces between the sample and the tip; such forces include electrostatic, magnetic, and van der Waals forces. In either mode of operation, measurements of the sample's surface topology or other characteristics are obtained by measuring deflection of the cantilever 102. It is measured as is typical using precisely aligned optical components 120 coupled to a deflection measurement circuit 122, although other techniques may be used.

Atomic force microscopy is capable of imaging conductive as well as insulating surfaces with atomic resolution Typical AFMs have a sensitivity of 0.1 Angstrom in the measurement of displacement.

While the invention is being described in connection with an atomic force microscope, it is also applicable to a scanning tunneling microscope (STM). Conventional STMs are used primarily to monitor the electronic character of the surfaces being scanned. In such arrangements, tunneling currents in conductive or semiconductor samples are induced by placing a conductive tip comparable to tip 104, one to ten Angstroms above the sample, and introducing a low voltage electric field (typically less than one volt) between the same and the sample. (The latter typically is mounted on a metal plate for ease of electrical connection.) Tunneling current, drawn from the tip through the gap 130 between the tip 104 and sample 106, is indicative of the size of such gap. STMs typically have two modes of operation. The first is referred to as the constant height mode, for very flat samples, in which the tip is scanned at a constant height and the tunneling current is measured to determine the topography of the sample. The second mode, the constant current mode, is one in which tunneling current is kept constant by varying the height of the cantilever until a preselected current level is restored.

The invention is also applicable to near field acoustic microscopy. Acoustic microscopy is an analysis approach that can be used alone or in conjunction with either AFM or STM, to analyze the topography and material characteristics of a substrate or other target object. The generated high frequency waves can be used to measure material properties both at the surface and just beneath the surface of a sample. Such a microscope is applicable to scanning both conducting and insulating surfaces, and can be used to detect impurity atoms in a sample near the surface, such as those placed in a sample using ion implantation.

As described to this point, the elements of the scanning probe microscope of the invention are generally conventional in nature. The scanning apparatus as described can be thought of as means which support a sample and a probe for relative scanning movement therebetween. The tubular scanner 204 is a portion thereof.

Figure 3:
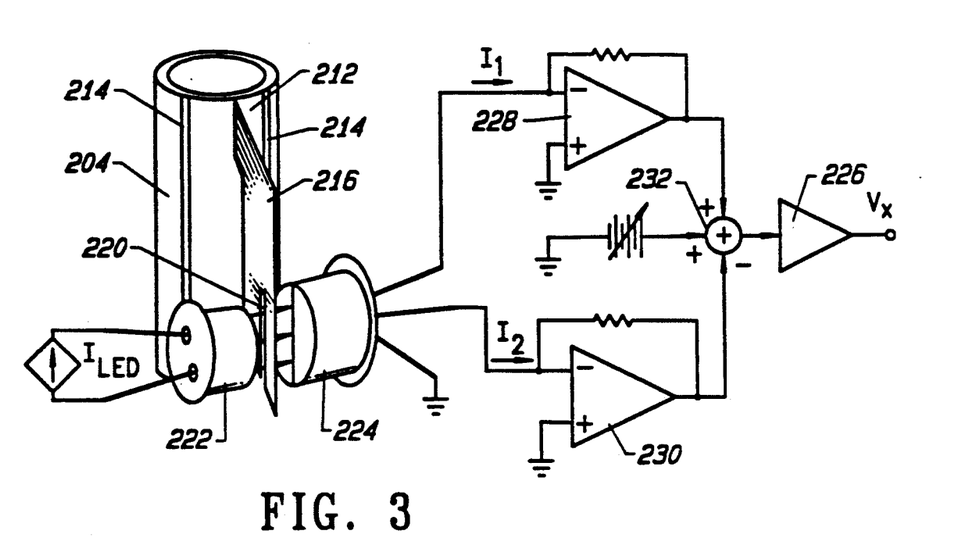
FIG. 3 is a schematic representation of a preferred embodiment of the invention having an optical beam position sensor.
Figure 4:
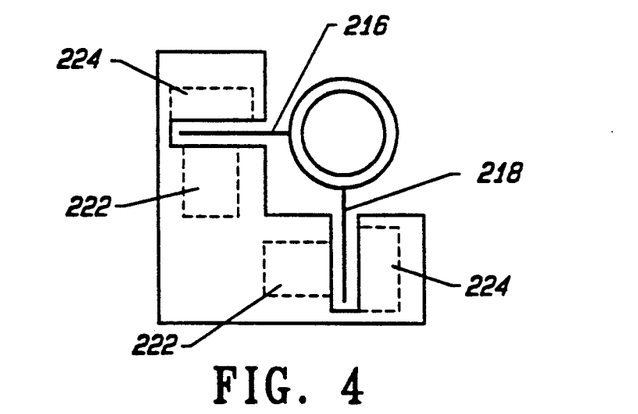
FIG. 4 is a somewhat schematic plan view of the arrangement of FIG. 3 showing the sensors for two orthogonal directions.

In keeping with the invention, means are provided for sensing position of the tubular scanner along one or more selected coordinates, the x and y geometric linear coordinates in the preferred embodiment being described relative to the probe. Such sensing means is an optical-beam position sensor and, as illustrated in FIGS. 3 and 4, includes a pair of vanes 216 and 218 which are orthogonal to one another and respectively extend along the x and y coordinates. Each of these vanes 216 and 218 has an optical slit 220 which with its associated vane controls the flow of optical radiation (The term "optical radiation" as used herein is meant to encompass electromagnetic radiation in the visible wavelength spectrum and in other adjacent wavelength spectrums—typically radiation of a wavelength in the range of between 1 and 15,000 nanometers.) flowing on a path between a source of the same 222 and a detector 224. Although various light sources could be used, a narrow-beam infrared light-emitting diode (LED) is used in this preferred embodiment. While a semiconductor laser has high power, it is less reliable, more expensive and noisy. An incandescent source has low efficiency (produces lots of heat) and has bad beam shape characteristics. The photodetector selected is a bi-cell segmented one. The structure of the two optical beam displacement sensing arrangements are the same and only the one for the x coordinate and its electronics will be described in some detail.

The LED 222 illuminates the slit 220 with a broad beam of light. As the scanner 204 moves, the vane 216 and its slit 220 moves across the segmented photodetector, resulting in a bar of light moving across the detector. The position of the bar of light is then converted into an output voltage $V_x$ by a preamplifier 226 which subtracts the photocurrents produced by the two segments of the detector. To this end, the respective photocurrents are directed as illustrated to the negative inputs of feedback amplifiers 228 and 230. The positive terminals of feedback amplifiers 228 and 230 are connected to ground. The preamplifier 226 also adds an offset signal as indicated at 232 to the difference to balance the detector. Separate circuits are used to measure the x and y positions. The gains of these two circuits are adjusted independently to make the sensitivities in the x and y directions equal.

It has been found that above about 5 Hz, the detector is nearly shot-noise limited with a noise level of 0.18 $\text{Å}_{rsm}/\sqrt{\text{Hz}}$. Below 5 Hz, 1/f noise is dominant. This 1/f noise is due to intensity fluctuations in the LED. It could be significantly reduced with an incandescent source, but at the cost of much higher power consumption and correspondingly worse thermal drift problems. Alternatively, balancing out variations in the LED intensity through a differential measurement scheme could be used to reduce the low-frequency noise. Different LED's have considerably different low-frequency intensity noise. Generally, the normalized 1/f noise increases with the power rating of the LED. The total integrated noise of the detector is 6.1 $\text{Å}_{rms}$ over a frequency range of 0.5 Hz to 1 kHz, and 29 $\text{Å}_{rsm}$ from 0.01 Hz to 1 kHz. Since the resolution of an AFM is normally no better than 50 Å when imaging large-scale objects, the observed noise level is quite adequate. The drift in detector output over a 30 minute time interval is approximately 200 Å.

It is to be noted that vane 216 is connected to scanner 204 adjacent its upper end 236, the end supporting the sample. The other end of the scanner, end 238, is maintained stationary. The result is that all movement of the scanner is at its free end 236 and all of such movement is transmitted to the vane 216 for accurate sensing.

The invention also includes means for responding to the sensing by compensating for any difference between the actual position of the scanner along the respective coordinates during a scan and expected positions of the same therealong. Two basic methods are available: (1) post-imaging correction—record the (x,y) position of the scanner at each sampled position of the image and then process the data to produce a corrected image, or (2) real-time feedback correction—use the (x,y) information from the sensor to produce a closed-loop control system which accurately positions the scanner at the desired location for each sample point of the image.

Each approach has advantages and disadvantages. Post-imaging correction allows fast imaging rates and is quite simple. However, the resulting image is not rectangular, the computation time required to reconstruct the image can be quite extensive, and interpolation errors can blur the image. In most cases, the resulting non-rectangular image is made rectangular again by cropping the original data, since most image processing software can only handle rectangular images. This operation can result in discarding a substantial fraction of the data since the original scan area is often a curved parallelogram. Feedback correction eliminates the need for post-imaging processing, and does not require that data be discarded in order to generate rectangular images. However, the scanner motion is much noisier because of the control system noise (usually dominated by the sensor noise). Scan speeds are also limited by the dynamic response of the control system, and a high-speed control system can make the microscope more unstable. Both approaches are part of the invention and the best to use in a particular application is determined by the application.

Post-Imaging Correction

Figure 5:
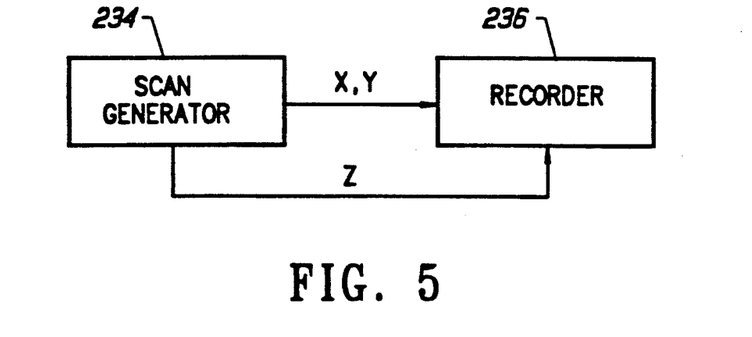
FIG. 5 is a simplified block diagram of a post-imaging correction system of the invention.

In this mode of operation, a standard raster scan voltage is applied to the piezoelectric scanner and the z-data is collected at regular intervals of time, just as in normal imaging. In addition, however, the x and y positions of the scanner are read from the scan sensor at each z-data point. These data describe a parametric image with (x,y,z) triplets as a function of time. FIG. 5 is a quite simple block diagram of this operation. The scan generator is represented at 234. As illustrated, the x,y positions are fed to a recorder (as will be discussed below) 236 and correlated with the z-data points. After the imaging is completed (or in real time if such computational power is available), the (x,y,z) triplets are interpolated into a single function z(x,y) where x and y are defined at equally-spaced intervals across the image. Analog-to-digital converters are used for collecting this data. The sampling resolution of the analog-to-digital converters that are used to measure x and y needs to be on the same order as the noise of the position sensor in order to take advantage of the capabilities of the sensor. The analog-to-digital converters should also have a wide enough dynamic range to read the scan sensor accurately across its entire range. Given typical values of 10 Å resolution and a 30 μm range, this requires at least 15 bits of dynamic range for each of the analog-to-digital converters. The quantity of data acquired becomes quite substantial. Assuming a 512×512 image for high-precision measurements, and two bytes of storage for each value of x, y, and z, the storage requirement for one image is 1.5 Mbyte.

Two different methods for interpolating the parametric image into a standard rectangular image are described below. Both require that the user view a plot of the original data displayed in real-space, and select a rectangular area which will be the area of the corrected image. After selecting this area, the fastest method to generate the corrected image is to step through the parametric data triplets and transform each (x,y) coordinate into the appropriate location in the corrected image. The z-value is then stored at the closest grid point in the corrected image array. After doing this for each data triplet, the corrected image is searched, and any unfilled grid points are filled with a linear interpolation between those of the four nearest neighbors which have been assigned values. This method is quite fast, but the resulting images become quite ragged, with lines which were smooth in the original image becoming jagged.

A second method for generating the final image, which is more time-consuming but also more accurate, involves a weighted interpolation. The data triplets are again stepped through and each (x,y) coordinate is transformed to an appropriate position in the corrected image. This position will have four nearest-neighbor grid points in the corrected image array. Instead of placing the z data value at the closest grid point, a weight is determined for each of the neighbors which corresponds to how close the transformed coordinate is to each neighbor. The total weight for each grid point is accumulated in a separate weighting-array, while the product of the z-value and weight is accumulated in a z-array. After stepping through all of the (x,y,z) triplets, the z-array is divided by the weight-array. Any grid points that are given any weight, i.e., did not border on any of the data points, are assigned z-values corresponding to the average of their neighbors. The images that result from this type of correction do not contain all of the rough, jagged features which characterize those produced by the first method. The weighting does blur the image somewhat near sharp features, but more accurate measurements can be made from it than from the coarse images produced by the first method.

Both methods for interpolating the parametric image are most easily accomplished by appropriately programming a computer to implement in software the algorithms described above defining the same.

Feedback Correction

A completely different approach of the invention generates undistorted AFM images using a feedback control system to accurately position the scanner for each data point. In this case, the system corrects the scanner distortions in real-time with hardware rather than by recording the distortions and correcting them later via software. In conventional AFM, the scan voltage signals are simply applied to the scanner and then it is assumed that the scanner moves in an ideal, linear manner according to the applied voltages. However, this is not the case. Using a feedback system, the scan signals become the reference signals for a control system. The control system is then used to move the scanner until its position matches the reference signals. This approach offers several advantages over the post imaging correction methods described above. First, there is no need to record the (x,y) position of the scanner at each data point, eliminating the precision sampling and large storage problems associated with collecting such data. Second, no time-consuming computation is necessary to remove the distortions from the images. Third, there are no interpolation errors added to the image. Finally, no data is discarded, as is the case when the distorted images are converted into standard rectangular images using the software methods.

A suitable control system must have several properties: stability, acceptable steady-state error, and acceptable dynamic response. Stability is an obvious requirement which demands that the system not generate control signals which grow exponentially in time. This requirement corresponds to saying that no poles of the closed-loop system may be in the right-half of the s-plane. The steady-state error of the system is defined as the difference between the reference signal and the actual system output in the limit as time goes to infinity. This error depends both on the control system and the reference signal being applied. For most AFM applications, the scan signal is a ramp and so a control system which will follow a ramp well is required. A type-zero control system (no integral feedback), will not follow a ramp but instead diverges from it linearly in time. A type-one system (single-integration feedback) will follow a ramp but maintains an error which is constant in time. A type-two system (double-integration feedback) will follow a ramp with zero steady-state error. Therefore, the system should include double-integration feedback in order to eliminate the steady-state error. The dynamic response of the system governs how the system will behave when it encounters a disturbance. The primary disturbance is the turn-around of the scan at the end of each scan line. There will be a transient error at this point which will die away in an exponential fashion. The peak overshoot and decay time of this transient characterize the dynamic response of the system. Generally, the dynamic response can be improved by increasing the gain of the system; however, at some point the system will become unstable and the gain must be decreased. An alternative method for improving the dynamic response is to include derivative feedback in the control system. This method makes the system "anticipate" changes in the reference signal by correcting for the direction the error is moving, instead of simply correcting for the magnitude of the error. Alternatively, non-linear control methods can be used to reduce the turn-around transient.

Figures 6, 7, 10:
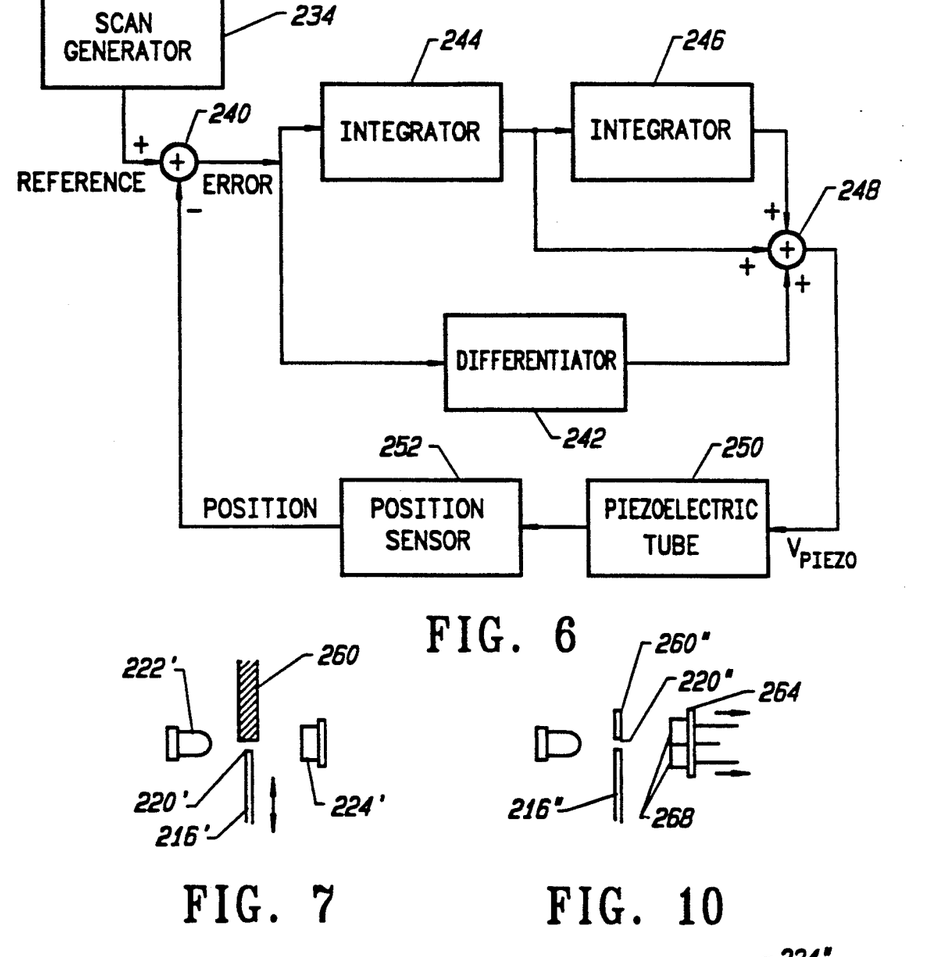
FIG. 6 is a somewhat schematic electrical block diagram of a real-time correction system of the invention.
FIGS. 7, 8, 9, 10, 11A, 11B, 12, 13, 14 and 15 schematically illustrate various alternate arrangements for the means for sensing included in the previously described embodiment of the invention.

FIG. 6 is a block diagram of a responding means of the invention developed with the above considerations in mind. It utilizes derivative and first and second integral feedback. Two parallel circuits were built, one each for the x- and y-axes. Since the coupling between x and y was less than 10%, the systems performed virtually independently. The scan generator is represented at 234. It generates a scan signal which is subtracted as is represented at node 240 from a position signal which is indicative of an actual position of the scanner along the relevant coordinate. This node is part of a feedback arrangement which produces the position signal based on an error signal, i.e., the output of the node 240. As illustrated, such error signal is differentiated as indicated at 242 and both the first and second integral thereof are taken as represented respectively by integrators 244 and 246. The derivative and the outputs of the integrators are summed as represented by node 248 and then directed to the tube 204 represented by block 250. The position of the tube is then sensed as indicated by block 252, and a signal indicative of its position along the coordinate is produced to be combined with the scan generator signal as indicated and discussed above.

The gains of the various feedback paths should be adjusted to achieve acceptable performance. First, a small amount of integral feedback may be turned on to bring the system close to the reference value. Then, the derivative feedback may be increased until it is near the edge of oscillation. The derivative feedback allows the other gains to be increased considerably higher before oscillation begins, than is possible in the absence of the derivative signal. This system also exhibits a marginally stable state where a constant oscillation, about 50 Å in amplitude, is observed. In one implementation, it was found that oscillation could be eliminated by turning down the derivative gain. Finally, the first and second integral gains should be increased to a level somewhat below the threshold of oscillation.

By observing the error signal with a small scan signal applied, the effects of the different feedback components can be observed. With first-integral feedback alone, the error signal exhibits the steady-state error that results from a type-one system attempting to follow a ramp reference signal. As the gain of the first-integral signal is increased, the steady-state error is reduced. When the second-integral feedback is added, the steady-state error is brought to zero and the only remaining error is the transient that occurs at the beginning of each new scan line. The nature of this transient is affected by the gains. Since the gains can be greatly increased when a derivative feedback signal is included, a much faster transient response is possible than with integral feedback alone. With a scan rate of 10 Hz, the maximum scan error at the turn-around is 1.6% of the total scan size.

The turn-around transient does add some distortion to the images. Its absolute amplitude is proportional to the velocity change of the scanner, which is proportional to the product of the scan size and scan frequency. This turn-around transient limits the maximum speed of the AFM imaging. The minimum time which can be spent on a single scan-line is the time required for the transient to decay to an acceptable level. For an implementation having a lowest scanner resonance frequency of 1.2 kHz, the decay time for the transient is 1.8 ms. Assuming that it is desirable to use at least 75% of the image and that a delay of three time constants is required to allow the transient to die out adequately before taking data, the scan frequency is limited to 46 Hz. By scanning larger than the desired image size, but not taking data at the beginning of each scan line, the effects of the turnaround transient are minimized. The feedback correction method produces clearer images than the software correction method for large scans such as this one, because there are no interpolation errors. However, for scans smaller than about 5000 Å the noise in the scan caused by the feedback system (dominated by the sensor noise) begins to noticeably degrade the image quality.

Residual Distortion

The degree to which distortions can be removed is ultimately limited by the quality of the detector which is used to determine the true motions of the scanner. The most significant distortion in the uncorrected scanner is the nonlinearity of the scan lines. Because of the hysteresis and creep in the scanner, the calibration of the scanner can change by over 50% from one side of the image to the other. Closely linked to this distortion is the nonlinear scaling of the scan size to scan signal amplitude. In order to evaluate how well these distortions are being eliminated by the invention, traces were taken through images of gratings along the fast-scan direction and were analyzed to determine the positions of the periodic peaks. Then a second-order least-squares fit was made to the peaks to determine the actual position of the scanner as a function of the pixel number of the scan. The linear term reveals the sensitivity of the scanner, while the quadratic term indicates the variation in sensitivity across the image.

A piezoelectric tube scanner produces a total scan size which does not scale linearly with the applied voltage. When run without correction, the scanner sensitivity increases by about 3.5% for each micron of desired scan size (i.e. the scan size predicted by the small signal scanner sensitivity). Therefore, a 1 $\mu$m nominal scan is actually 1.035 $\mu$m and a 15 $\mu$m nominal scan is actually 22.9 $\mu$m. This distortion is almost completely eliminated when either of the scan correction approaches of the invention are used. For corrected images, the variation in calibration of the scanner is only about 1%, independent of the scan size.

We define the quadratic error of the scan to be the ratio of the maximum value of the quadratic component of the scan to the entire scan size. Uncorrected scans contain a quadratic distortion which grows linearly with the scan size. In some experiments conducted by the inventors, the quadratic distortion was about 1.4% per micron of the total scan size. Therefore, a 20 $\mu$m scan had a 28% quadratic distortion. This distortion results in an image where the calibration changes by 44% from one side of the image to the other. Either of the correction approaches described above results in a reduction of this quadratic distortion to (1.5±0.8)%, independent of the scan size. Thus, for normal large-scale images, the quadratic distortion is reduced by about one order of magnitude. The improvement is somewhat more for larger images and somewhat less for smaller images. This residual quadratic distortion is persistent in both sign and magnitude. It is not an inherent nonlinearity in the position sensor because its sign does not reverse when the scan direction is reversed. It is also of the same sign as the inherent nonlinearity of the scanner in both the x and y directions. Since the position sensor does not actually measure the position of the sample, but rather the position of a vane that is attached to the scanner, this residual distortion may be due to nonuniform movement of the piezoelectric tube. If different parts of the tube have different nonlinear effects, then the vane will not necessarily move linearly with the sample.

Various other sensor geometries are usable with the invention. The preferred sensor is an optical-beam displacement one because of its simplicity, both in physical design and electrical signal processing and low noise. FIGS. 7 through 11B are schematic showings of variations of such a sensing means. FIG. 7 shows an arrangement in which the optical slit 220' is not integral within the vane but has its size controlled by movement of the vane represented at 216' relative to a fixed wall 260. Thus, such slit 220', although defined by the vane, has its size changed by movement of such vane. The result is that it controls the intensity of the optical radiation from the optical source represented at 222' to a photodetector 224'. This detector, of course, measures the intensity rather than the location of the radiation it receives.

Figure 8:
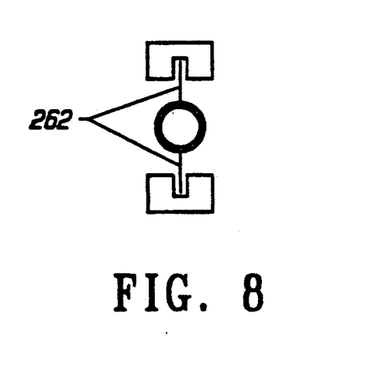

The arrangement of FIG. 8 is one in which there are a pair of vanes 262 extending from a scan tube represented at 204'. Each of these vanes defines an optical slit in an optical radiation flow path and separate photodetectors represented at 222' are provided. Movement of the tube along a coordinate will be measured in both opposing directions, one of such measurements then can be subtracted from the other to aid in canceling errors. This arrangement also provides a better signal-to-noise ratio.

Figure 9:
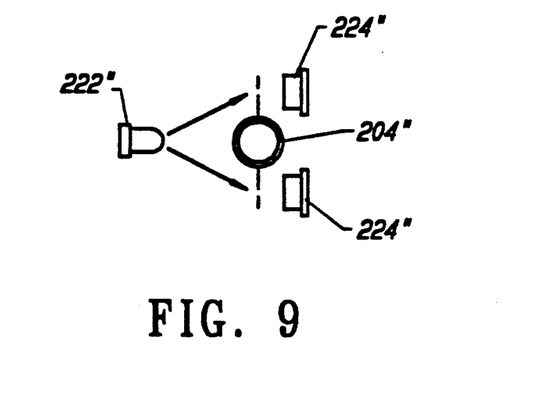

The sensor schematically illustrated in FIG. 9 eliminates noise due to intensity fluctuations in a light source. That is, only one light source 222'' is provided for two separate light paths through opposing vanes on a tube 204'' to separate detectors 224''. It will be seen that any intensity fluctuation in the light source will be detected by both of the photodetectors and the error caused by the same will be canceled when the measurements along the opposing directions are subtracted from one another in accordance with the embodiment described previously.

The arrangement shown in FIG. 10 also eliminates noise due to intensity fluctuations in a light source. Again, only one light source is shown. The slit 220" that is illustrated is similar to the one of FIG. 7 in that its size is controlled by movement of a vane 216" relative to a fixed wall 260". A light intensity detector 264 is provided, which detector is, in essence, two separate detectors. In connection with the latter, it measures the intensity of optical radiation received on its two halves 268. The true position of the scanning tube (not shown) is then simply the subtraction of the outputs of the two detector halves, divided by their summation.

Figure 11A:
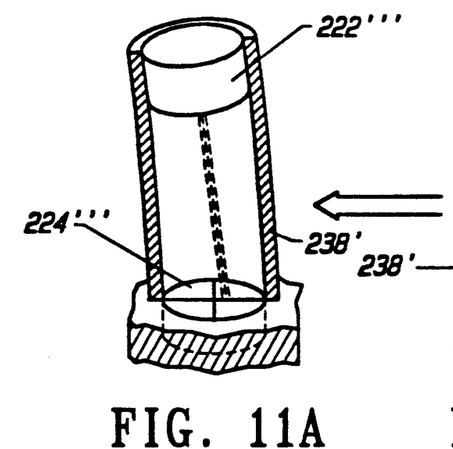
Figure 11B:
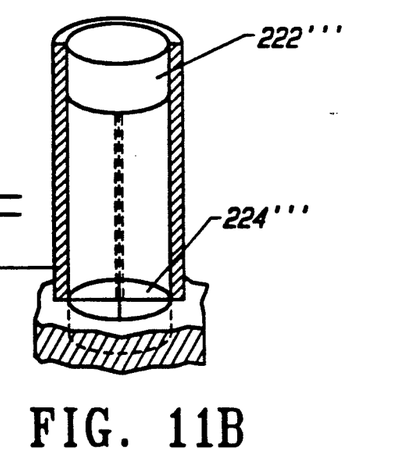

FIGS. 11A and 11B illustrate an optical-beam position sensing means which has only one source and detector for both coordinates. A quadrant detector represented at 224''' is located within an elongated scanner tube at an end thereof 238' which is maintained stationary. A source of a collimated and narrow beam of optical radiation represented at 222''' is spaced lengthwise of the scanner so that any bending movement along the length of the scanner between the source and the detector will change the direction of flow of the optical radiation. Most desirably the source is located at the free end of the scanner as illustrated to maximize the distance along the length of the tube between it and the detector, and thereby increase the sensitivity of the sensing.

Figure 12:
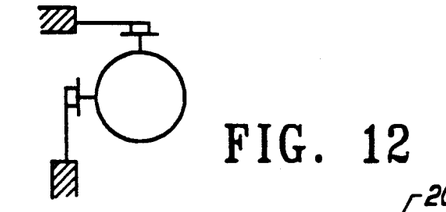
Figure 13:
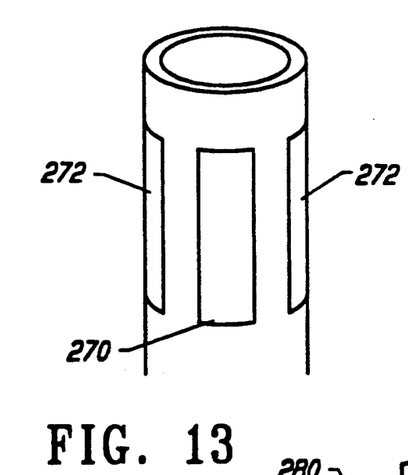
Figure 14:
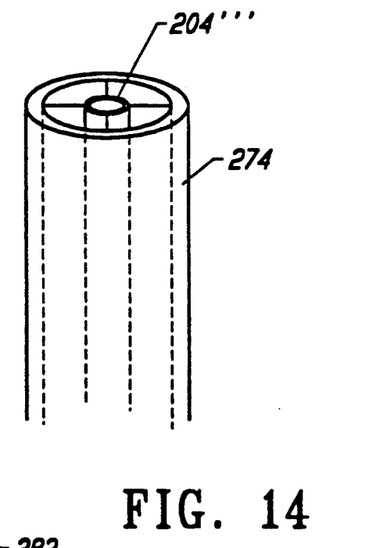

The invention is also applicable to sensor arrangements which rely on connection of a strain gauge to the tube so as to provide an output signal reflective of the tube's position. FIGS. 12-14 show suitable arrangements. FIG. 12 schematically illustrates a relatively simple cantilever arrangement. The strain gauges are simple displacement detectors placed in cantilever fashion along the xy coordinates, à la piezoresistors. Relative to FIG. 13, four strain gauge sheets 270 and 272 are bonded or otherwise adhered to the surface of the scanner. Two of these sheets, 270, (only one of which is shown) extend in opposite directions along one of the xy coordinates, whereas the other two sheets, 272, extend in opposing directions along the other coordinate. It will be seen that with this arrangement any distortion of the tube along its length, i.e., changes in position of the scanner indicative of corresponding changes in position of the sample, will be reflected in output signals from the strain gauges. In the arrangement shown in FIG. 14, strain gauges are connected between the tubular scanner represented at 204''' and an outer rigid tube represented at 274. Such tube is maintained stationary so that it does not move with the scanner during the scanning operation. The result is that the output signals from the strain gauges will be indicative of the scanner position.

Figure 15:
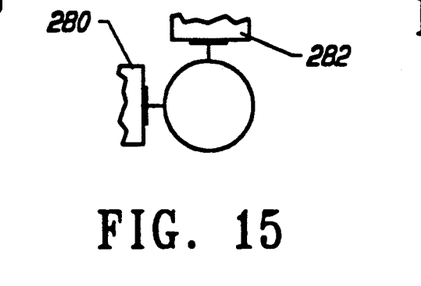

While capacitive sensors work quite well, they have an inherent non-linearity which is difficult to remove. The invention, though, is applicable to the same. Reference is made to FIG. 15 which shows a relatively simple arrangement. Capacitor meters represented at 280 and 282 are connected to the scanner along the x and y coordinates. It will be recognized that any movement of the scanner in either direction will result in a change of capacitance in the appropriate meter and, hence, a sensing of such movement.

The invention has been described in detail in connection with preferred embodiments. Many changes and variations can be made and will be obvious to those of ordinary skill in the art. It is therefore intended that the coverage afforded applicant be only defined by the claims and their equivalents.

What is claimed is:

1. In a scanning probe microscope, the combination comprising:
    a) means for supporting a sample and a probe for relative scanning movement therebetween;
    b) means for sensing a multiple number of times during said relative scanning movement, the position of a portion of said support means along a selected coordinate; and
    c) means for responding to said sensing by compensating for any difference between the sensed positions of said portion along said coordinate at the time of said sensings and expected positions of the same therealong.

2. The scanning probe microscope of claim 1 wherein said portion includes piezoelectric material providing scanning movement.

3. The scanning probe microscope of claim 2 wherein said portion is at least one tubular scanner supporting said sample.

4. The scanning probe microscope of claim 1 wherein said expected positions of the same therealong respectively are ones which are expected because of the happening of predetermined events.

5. The scanning probe microscope of claim 4 wherein each of said predetermined events is movement relative to said sensing means along an axis which is generally normal to said coordinate.

6. The scanning probe microscope of claim 4 wherein said responding means includes means for recording the corresponding positions of said portion relative to each of said predetermined events.

7. The scanning probe microscope of claim 1 wherein said sensing means includes a source of optical radiation, a photodetector positioned to receive optical radiation from said source, and radiation flow control means for responding to movement of said portion to said position by controlling the flow of optical radiation from said source to said photoconductor in a manner indicative of said position.

8. The scanning probe microscope of claim 1 wherein said sensing means includes a capacitive sensor connected between said portion and structure which does not move with said scanner.

9. The scanning probe microscope of claim 1 wherein said sensing means includes a strain gauge connected to said portion so as to provide an output signal reflective of said position.

10. The scanning probe microscope of claim 1 further including means for generating a scan signal indicative of movement of said portion, and said responding means includes feedback means for summing said scan signal with a signal indicative of an actual position of said portion along said selected coordinate.

11. The scanning probe microscope of claim 10 wherein said feedback means includes means for taking the derivative of an error signal indicative of said difference, means for obtaining the second integral of said error signal, and means for summing signals indicative of said derivative and second integral in the formation of said signal indicative of the actual position of said portion.

12. The scanning probe microscope of any of the previous claims wherein there are two of said coordinates generally orthogonal to one another, said sensing means senses the position of said portion along both of said coordinates, and said responding means compensates for differences along both of said coordinates.

13. In a scanning probe microscope, the combination comprising:
   a) means for supporting a sample and a probe for relative scanning movement therebetween;
   b) optical-beam position sensing mans for sensing a multiple number of times during said relative scanning movement, the position of a portion of said support means along a selected coordinate; said sensing means including a source of optical radiation, a photodetector positioned to receive optical radiation from said source, and radiation flow controlling means for responding to movement of said portion to said position by changing the flow of optical radiation from said source to said photodetector in a manner indicative of said position; and
   c) radiation flow controlling means for responding to movement of said portion to said position by changing the flow of optical radiation from said source to said photodetector in a manner indicative of said position.

14. The scanning probe microscope of claim 13 wherein said portion is at least one elongated scanner having a first end positioned to support said sample and a second end opposed to said first end held stationary, and said flow control means senses movement of said scanner adjacent said first end.

15. The scanning probe microscope of claim 13 wherein said portion is at least one elongated scanner positioned to support said sample, and said means for sensing further includes means securing said source spaced lengthwise of said elongated scanner from said photodetector so that any bending moment along the length of said scanner between said source and said photodetector changes flow of optical radiation therebetween.

16. The scanning probe microscope of claim 13 wherein said portion is at least one scanner supporting said sample, and said flow control means includes a vane secured to said scanner for movement therewith to control said flow.

17. The scanning probe microscope of claim 16 wherein said vane defines an optical slit in the path of flow of radiation between said source and said photodetector.

18. The scanning probe microscope of claim 15 wherein said flow control means comprises a pair of vanes extending in opposing directions along said selected coordinate, each of which defines an optical slit in a path of flow of optical radiation, and a pair of photodetectors are provided to intercept optical radiation which flows along said path.

19. The scanning probe microscope of claim 18 wherein there is a single source of optical radiation providing separate paths of flow of optical radiation respectively to said photodetectors.

20. In a scanning probe microscope, the combination comprising:
   a) a scanner supporting a sample for scanning movement relative to a probe;
   b) optical-beam position sensing means for sensing a multiple number of times during said relative scanning movement, the position of said scanner along a pair of selected orthogonal coordinates; said sensing means including for each of said coordinates, a source of optical radiation on one side of its associated coordinate, a photodetector on the opposite side of said coordinate, and a vane secured to said scanner for movement therewith, which vane extends between said source and said photodetector and defines an optical slit in the path of flow of optical radiation between said source and said photodetector to control the flow of optical radiation between said source and said detector in a manner indicative of the position of said scanner along said coordinate; and means for responding to said sensing by compensating for any difference between the sensed positions of said portion along each of said coordinates and expected positions of the same therealong upon movement relative to said sensing means along an axis which is generally normal to said coordinate.

21. The scanning probe microscope of claim 20 wherein said responding means includes means for recording the corresponding positions of its associated scanner relative to each of said movements.

22. The scanning probe microscope of claim 20 further including means for generating a scan signal for movement of said scanner, and said responding means includes feedback means for summing said scan signal with a signal indicative of an actual position of its associated scanner along the orthogonal coordinates associated therewith.

* * * * *